US012800704B2

(12) United States Patent
Moreira et al.

(10) Patent No.: US 12,800,704 B2
(45) Date of Patent: Nov. 17, 2026

(54) CASCADED RADAR SYSTEM WITH TRANSMITING-VEHICLE REFLECTION MITIGATION

(71) Applicant: NXP B.V., Eindhoven (NL)

(72) Inventors: Cristian Pavao Moreira, Frouzins (FR); Julien Orlando, Toulouse (FR)

(73) Assignee: NXP B.V., Eindhoven (NL)

( * ) Notice: Subject to any disclaimer, the term of this patent is extended or adjusted under 35 U.S.C. 154(b) by 279 days.

(21) Appl. No.: 18/598,525

(22) Filed: Mar. 7, 2024

(65) Prior Publication Data

US 2024/0310474 A1 Sep. 19, 2024

(30) Foreign Application Priority Data

Mar. 16, 2023 (EP) .................................... 23305354

(51) Int. Cl.

*G01S 7/02* (2006.01)
*G01S 7/03* (2006.01)
*G01S 7/35* (2006.01)
*G01S 7/40* (2006.01)
*G01S 13/931* (2020.01)

(52) U.S. Cl.

CPC .............. *G01S 7/023* (2013.01); *G01S 7/032* (2013.01); *G01S 7/356* (2021.05); *G01S 7/40* (2013.01); *G01S 13/931* (2013.01); *G01S 2013/93275* (2020.01)

(58) Field of Classification Search

None

See application file for complete search history.

(56) References Cited

U.S. PATENT DOCUMENTS

| | | | | |
|---|---|---|---|---|
| 9,791,551 | B1 | 10/2017 | Eshraghi et al. | |
| 10,663,560 | B2 | 5/2020 | Ocket | |
| 2020/0003866 | A1 | 1/2020 | Bauduin et al. | |
| 2020/0278420 | A1 | 9/2020 | Papotto et al. | |
| 2021/0055401 | A1* | 2/2021 | Takayama | G01S 13/345 |
| 2021/0072349 | A1* | 3/2021 | Mayer | G01S 7/4017 |

FOREIGN PATENT DOCUMENTS

| | | | | |
|---|---|---|---|---|
| DE | 102016224945 A1 * | 6/2018 | | G01S 13/536 |

OTHER PUBLICATIONS

English translation of DE 10 2016 224 945 A1 (Year: 2018).*

Wikimedia Foundation, Inc. (Sep. 17, 2021). Voltage-controlled oscillator. Wikipedia. https://web.archive.org/web/20220110212145/https://en.wikipedia.org/wiki/Voltage-controlled_oscillator. Accessed via Wayback Machine (Year: 2021).*

* cited by examiner

*Primary Examiner* — Vladimir Magloire
*Assistant Examiner* — Anna K. Gosling

(57) ABSTRACT

A system and method for processing radar signals is presented. A first transmitted radar signal is transmitted by a first transmitter using a first local oscillator signal having a first frequency. The first transmitter is coupled to a structure of a vehicle. A first received radar signal is received using a first receiver. The first received radar signal is processed using a second local oscillator signal having a second frequency to generate a processed radar signal. The second frequency is offset from the first frequency by a predetermined offset value. An output signal is generated by executing a fast Fourier transform on the processed radar signal to generate a frequency-domain output signal.

14 Claims, 7 Drawing Sheets

CASCADED RADAR SYSTEM WITH TRANSMITING-VEHICLE REFLECTION MITIGATION

CROSS-REFERENCE TO RELATED APPLICATIONS

This application claims priority under 35 U.S.C. § 119 to European patent application no. 23305354.5, filed Mar. 16, 2023, the contents of which are incorporated by reference herein.

TECHNICAL FIELD

The present disclosure is directed in general to radar systems and associated methods of operation. In one aspect, the present disclosure relates to an automotive radar system that includes multiple radar transmitter and receiver devices and that are configured in a leader-follower configuration that is configured to mitigate the effects of transmitting-vehicle reflections.

BACKGROUND

A radar system transmits an electromagnetic signal and receives back reflections of the transmitted signal. The time delay and/or time delay variation between the transmitted and received signals can be determined and used to calculate the distance and/or the speed of objects causing the reflections, respectively. For example, in automotive applications, automotive radar systems can be used to determine the distance and/or the speed of oncoming vehicles and other obstacles. In some cases, various structures of the vehicle housing the radar system may additionally reflect the transmitted radar signals creating interference and noise that may interfere with proper radar system operations. For example, the bumper that houses the radar system may reflect portions of the transmitted signals, resulting in interference and inaccurate radar system measurements.

Automotive radar systems enable the implementation of advanced driver-assistance system (ADAS) functions that are likely to enable increasingly safe driving and, eventually, fully autonomous driving platforms. Although many different types and configurations of radar systems exist, many automotive applications employ cascaded topologies that utilize several radar transmitter/receiver devices or subsystems that each transmit and receive separate radar signals to provide high resolution radar imaging. Those radar systems typically include a primary ‘leader’ radar device and a number of secondary ‘follower’ devices. Control timing signals, such as clock signals, local oscillator signals, and other synchronization signals and commands are distributed by the leader radar device to the follower radar devices in order to maintain synchronicity and phase coherence between the radar signals being transmitted by each of the leader and follower radar devices, thereby enabling improved radar signal processing accuracy.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
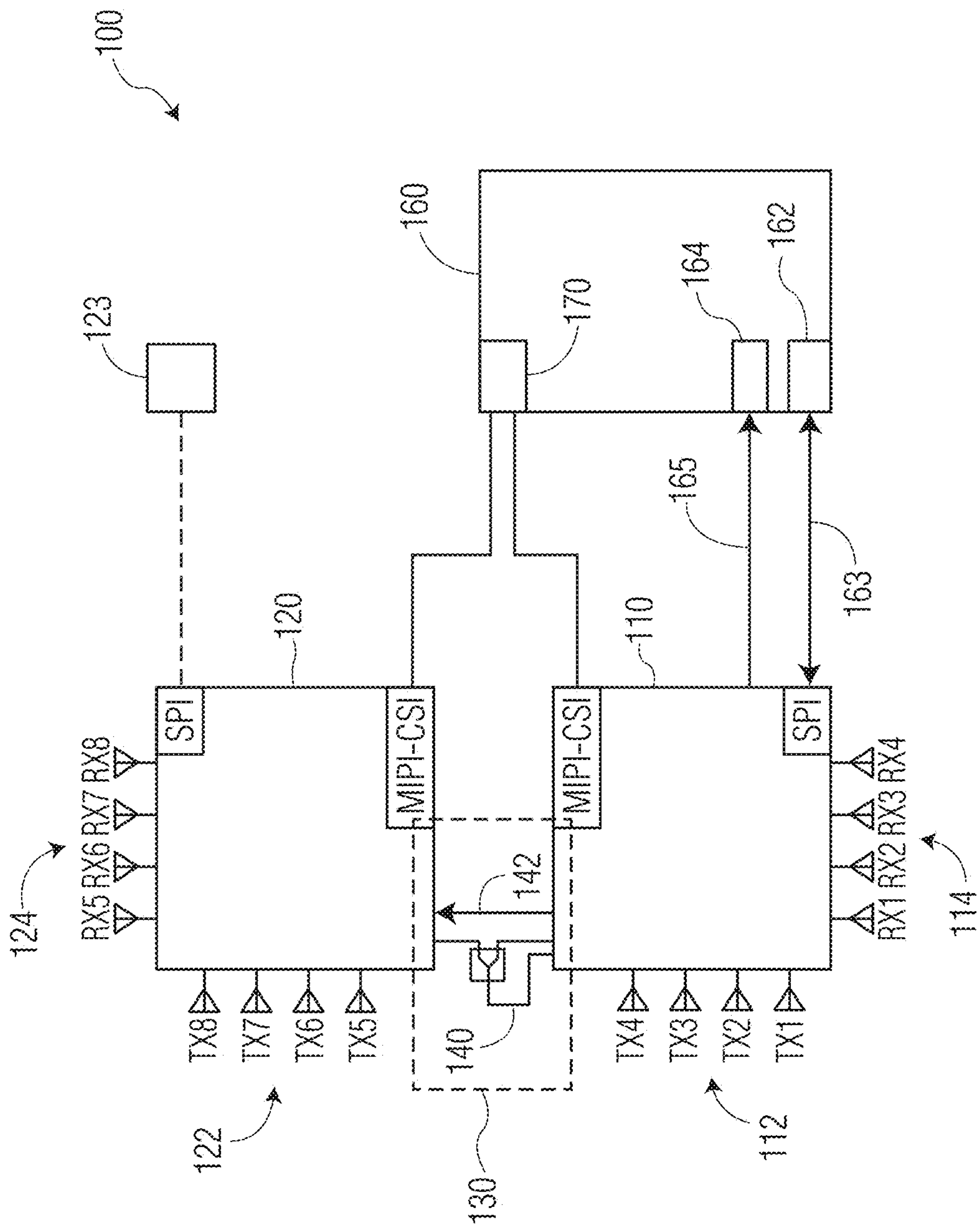
FIG. 1 is a block diagram depicting functional components of a radar system (e.g., an automotive radar system) with components arranged in a cascaded topology.

The following detailed description is merely illustrative in nature and is not intended to limit the embodiments of the subject matter of the application and uses of such embodiments. As used herein, the words “exemplary” and “example” mean “serving as an example, instance, or illustration.” Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

In radar systems, such as automotive radar systems, it is generally desirable to increase radar range along with doppler and angular resolution of the radar systems. To achieve desired performance, some radar systems rely on a number of individual radar transmitter/receiver subsystems that operate independently. The outputs of each of the separate radar transmitter/receiver subsystems can then be combined and analyzed to generate output data that is generally more accurate than that generated by a comparable radar system operating with only a single transmitter/receiver. The multiple transmitter/receiver subsystems further provide redundancy should a transmitter/receiver subsystem fail.

A radar system that utilizes multiple transmitter/receiver subsystems may operate those systems in a cascaded configuration in which a first subsystem is considered to be a leader device, while the other transmitter/receiver subsystems are considered follower devices. In that configuration the signals that control the timing operations of the various follower devices are typically provided by the single leader device, enabling coherent operation of the leader device and the follower devices.

A known issue for many automotive systems involves structures of the vehicle in which the radar system is housed reflecting the radar system’s transmitted signals, resulting in interference. In many cases, for example, radar systems are mounted within or near to the vehicle’s bumpers and those bumper structures can themselves reflect the transmitted radar signals. As such, although these interference reflection signals may be reflected by any of the components of the transmitting vehicle, the reflection signals will be referred to herein as generally “bumper reflections.” The bumper reflection signals mix with the reflected signals from objects in the environment and can causes ghost target objects to appear in the radar spectrum. The interference may manifest as intermodulation (IMD) products that appear in the spectrum of the reflection signals received by the radar system.

To mitigate the effect of bumper reflections, the present disclosure provides a cascade radar system implementation that utilizes a frequency offset in the timing signal transmitted between leader and follower radar devices to inhibit the generation of IMD products generated by near-range reflections (e.g., bumper reflections) and their corresponding ghost (or false) targets.

FIG. 1 is a block diagram depicting functional components of a radar system 100 (e.g., an automotive radar system) with components arranged in a cascaded topology. In the depicted radar system 100, the radar system cascades two radar devices. One of the two radar devices is defined as the leader radar device 110, which contains a first set of transmitter circuits coupled to transmit antennas 112 and a first set of receiver circuits coupled to receive antennas 114.

The leader radar device 110 provides a number of signals 130 to one or more follower radar device 120. In this way, leader radar device 110 leader and several follower radar devices (e.g., follower radar device 120) are cascaded coherently to increase the number of transmit and receive channels, thereby enabling an increase in radar system sensor accuracy and resolution.

Each leader radar device 110 and follower radar device 120 embeds several receiver and transmitter channels and a digital controller 160 that may operate as a simple digital controller, or may be implemented by a digital processor configured to combine data from all receivers, as well as to control and program the leader radar device 110 and follower radar device 120. The leader radar device 110 is arranged to distribute timing signals, such as a local oscillator (LO) signal 140 off-chip through transmission lines on a substrate (e.g., printed circuit board (PCB)) to which the components of depicted automotive radar system 100 are mounted to other system components (in this case the one other follower radar device 120.

Local oscillator (LO) signal 140 is used by the different transmitters and receivers to ensure that the downconverters in each receiver are at the same phase. Timing signal 140 is typically star-routed (i.e., routed via transmission lines have equal length) to each radar device (e.g., leader radar device 110 and follower radar device 120) to provide the same delay and precise phase coherence between the operations of all such radar devices. The follower radar device 120 (and further follower radar devices 123) contains a second set of transmitter circuits coupled to transmit antennas 122 and a second set of receiver circuits coupled to receive antennas 124.

The distribution of the LO signal 140 from the leader radar device 110 ensures that the follower radar device 120 is also able to use the LO signal 140, and thereby provides that the transmitting signal frequency and the LO frequency of the down conversion mixer (in RX blocks) of different radar ICs are the same. The LO signal 140 is used by all devices (including the leader radar device 110 wherein the LO signal 140 is routed out of the leader radar device 110 and thereafter back into the leader radar device 110. Typically, in cascade configuration, the LO signal 140 is routed with symmetrical PCB transmission line lengths in order to ensure that all receivers (encompassing a respective down mixer) in each leader radar device 110 and follower radar devices 120, 123 of depicted automotive radar system 100 receive the same LO signal with same phase. Other control signals may be synchronized with a lower speed clock, for example an analog-to-digital converter (ADC) clock, which may be used across multiple ICs/devices.

Leader radar device 110 is coupled to digital controller 160. Digital controller 160 includes various interfaces, such as a serial-parallel interface (SPI) 162, a general-purpose data input-output port 170, and controller clock interface 164, this clock signal 165 generally provided by the leader radar device 110.

Clock signal 142 is generated by leader radar device 110 and used as a time base for synchronization of the operations of leader radar device 110 and follower radar device 120 (and any other follower radar devices 123). The connection to the digital controller 160 consists of SPI control lines 163 and digital data line signals from leader radar device 110 and follower radar device 120 back to the digital controller 160 for later signal processing, in a given data format (e.g., Mobile Industry Processor Interface Camera Serial Interface (MIPI CSI-2), low voltage differential signaling (LVDS) or other formats).

The cascading clock signals transmitted between leader radar device 110 and follower radar device 120 are used for time-based synchronization of the sampling moments on the radar signal processing systems of the leader and follower radar devices. For optimal operation of distributed radar systems, it is important that these various signals (LO 140 and clock signal 142) are synchronous across all receiver circuits on different radar devices.

In general, within radar system 100 the LO signals are configured as chirp signals such that the radar signals transmitted by radar system 100 are themselves chirp signals. Radar signal reflections are simultaneously processed using the same LO signals. Because the transmitted signals are configured as chirp signals, any propagation delays in the received radar signals (e.g., due to the distance or range to the reflecting target) manifest as a frequency offset between the transmitted signals and the simultaneously-processed received reflection signals. By analyzing that frequency offset it is possible to determine a range to the target that generated the reflected signals. Furthermore, by monitoring the target range over time and at different receiver devices, it is possible to determine a relative velocity and direction of arrival of the target.

The present disclosure provides an approach for implementing a radar system in a cascade topology (i.e., leader-follower radar device) in a manner to reduce the deleterious effects of transmitting-vehicle bumper reflections on the accuracy of output data generated by the radar system. Specifically, the present disclosure reduces bumper reflection effects by implementing a new approach for distributing the timing signals (e.g., the LO signals) between leader and follower devices in which the frequency of the LO signal ($f_{LO}$) used to process received radar signals is adjusted based upon a frequency of the bumper reflection signals ($f_{BUMP}$) to convert the $f_{BUMP}$ frequency in the received reflection signal to a direct current (DC) offset in the received processed signal having no frequency. This DC component can then be high pass filtered to remove those DC offset components. Consequently, the radar receiver signal processing operation will only process signals received as reflections from 'real' target objects with no interfering bumper reflection signals. Consequently, the present radar system inhibits the generation of IMD products due to combination of bumper reflected signals and real target reflection signals. This can reduce the number of false targets in the receiver spectrum and can improve the performance of the radar system.

In typical implementations, the present radar system is in a cascading radar system arrangement with at least 2 radar devices (typically implemented as integrated circuits (ICs)), with at least one leader radar device configured to generate timing signals enabling the transmission of chirp sequences by the various radar devices. The components within each radar device that generates the chirp signals (i.e., the chirp phase locked loops (PLLs)) generate chirp signals based on a first LO signal that is distributed by the leader device. As described herein, rather than use that same LO signal to process received radar signal reflections, a follower device of the present radar system is configured to generate a second LO signal with a frequency offset from the first LO signal. The leader and follower devices then use the second LO signal to processed received reflection signals. The frequency offset between the first and second LO signals is determined by the frequency of bumper reflections generated in response to the transmitted radar signals.

Within the radar system itself, a number of electrical interconnects are formed to enable frequency offset LO signal distribution between the leader and follower radar devices such that the leader device's LO signal output pin is connected to the follower device's LO signal input pins, and the LO signal output pins of the follower devices are connected to the LO signal input pin of the leader device. This configuration enables both the leader and follower device to generate LO signals with frequencies that are different from one another. The frequency offset shift the received signal spectrum at both the leader and follower devices such that bumper reflection signals are translated into DC components during signal processing with no frequency. Those components can then be filtered out via appropriate high-pass filters in the radar system signal receiver and processing components.

To implement the present system, knowledge of the frequency of the bumper reflection signals ($f_{BUMP}$) is necessary. As such, an example approach for determining $f_{BUMP}$ and the appropriate amount of frequency shift to implement so that bumper reflection signals are minimized in any signals processed by the radar system is presented.

Figure 2:
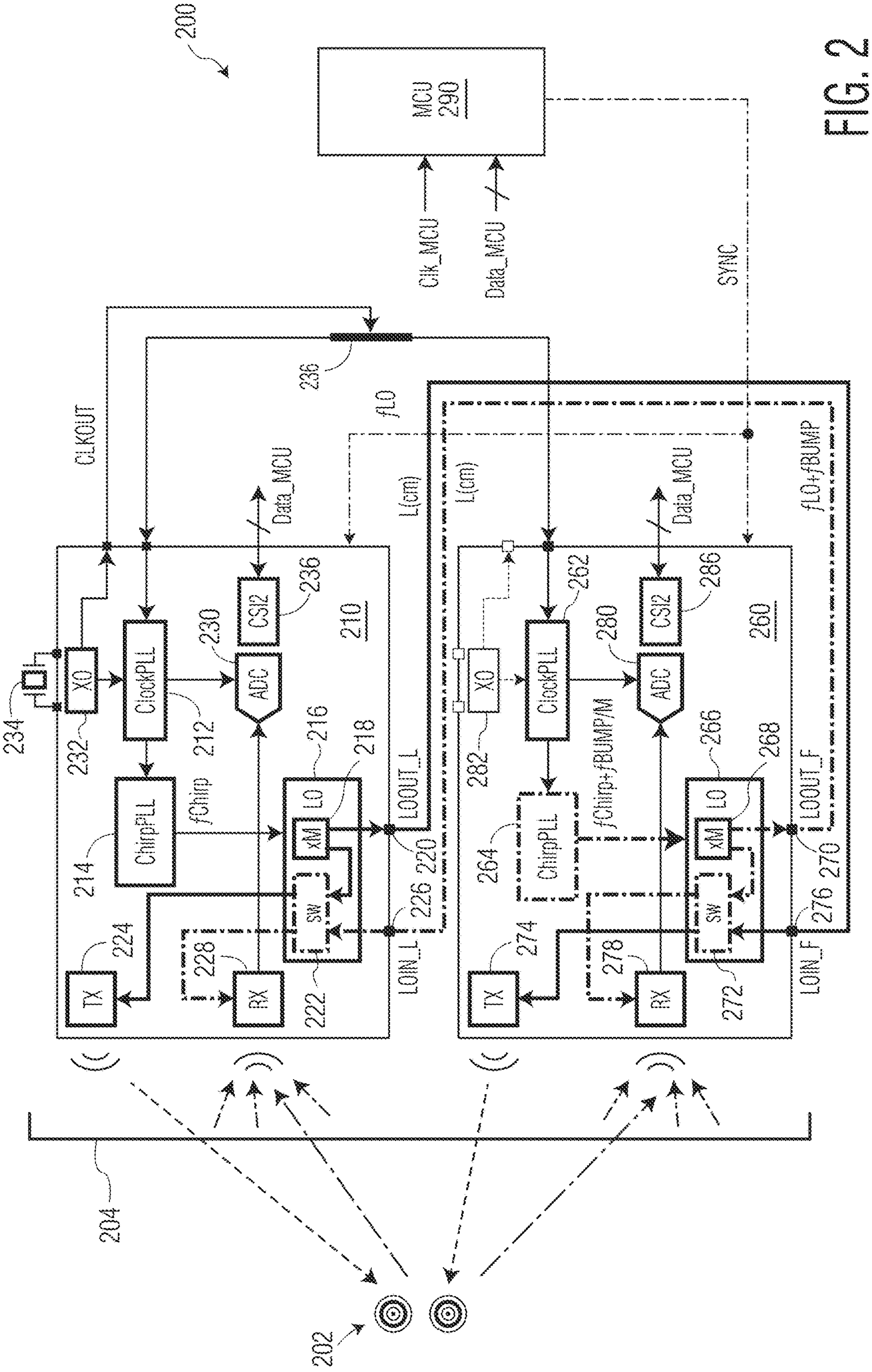
FIG. 2 depicts an example block diagram of a radar system having a cascade leader-follower arrangement.

FIG. 2 depicts an example block diagram of a radar system 200 having a cascade leader-follower arrangement. Radar system 200 is configured to transmit a number of radar signals towards target objects 202 that may be in the vicinity of radar system. The target objects 202 generate corresponding reflection signals that can be received and processed by radar system 200 to determine the position, velocity, and direction of arrival of the objects 202 with respect to radar system 200. As illustrated, the radar system 200 may be positioned nearby vehicle bumper 204 (or another component of a vehicle proximate to the radar system 200) that may itself reflect the radar signals transmitted by radar system 200.

In this example, radar system 200 includes leader radar device 210 and one or multiple follower radar devices 260. One follower radar device 260 is shown in FIG. 2 for clarity purposes only, with the potential for other similar follower radar devices being implemented within radar system 200.

Leader radar device 210 and follower radar device 260 are often implemented using the same components and circuitry. The circuit and/or component examples depicted may be implemented as any number of separate integrated circuits, such that the functional components of leader radar device 210 and follower radar device 260 can be incorporated into multiple separate ICs that are interconnected with one other in a suitable manner or in single ICs.

Leader radar device 210 incorporates a radar transceiver formed by at least a frequency generation circuit, which in this example includes a reference or clock phase locked loop (PLL) 212 and a chirp PLL 214. Chirp PLL 214 is configured to generate chirp signals having frequencies $f_{chirp}$ that are used in constructing transmitted radar signals and for the down conversion and processing of received radar signals.

An output from chirp PLL 214 is transmitted to LO interface 216. LO interface 216 includes a multiplier 218 configured to increase the frequency of the signal received from chirp PLL 214 by a multiple of M (e.g., determined by a predetermined frequency plan) to generate an LO signal. That LO signal is output by LO interface 216 at terminal 220 as a signal $LO_{out\_leader}$. The LO signal is also transmitted internally to switch 222, which transmits the LO signal to transmitter 224. Transmitter 224 uses the received LO signal $LO_{out\_leader}$ to generate radar signals that are transmitted by transmitter 224 towards target objects 202. Specifically, high-frequency output signals of the transmitter 224 are passed to power amplifiers (e.g., via a phase shifter circuit) (both not shown), where the signals are amplified within transmitter 224 and routed to transmitting antennae.

Leader radar device 210 includes terminal 226 that is configured to receive an input LO signal. As described in more detail below, the frequency of the LO signal received at terminal 226 is equal to the frequency of the LO signal output at terminal 220 plus an offset frequency so that the frequency of the LO signal output at terminal 270 is equal to the frequency of the reflection signals generated by bumper 204 (i.e., $f_{BUMP}$), which is at least partially determined by a distance between the radar system (e.g., transmitters 224, 274 and receivers 228 and 278) and bumper 204. That signal is received by switch 222 of multiplier 218 and transmitted to receiver 228. The receiver 228 uses that offset LO signal to process the received reflection signal.

The processed received signals are passed from receiver 228 through one or more programmable bandpass filter(s) and one or more gain amplifiers (not shown) to analog-to-digital converter 230 for processing of the received reflection signals to identify the relative range, velocity and direction or arrival of the various target objects 202.

Leader radar device 210 includes a clock distribution circuit 232. Reference clock signals are generated by clock distribution circuit 232 using an input signal from crystal oscillator 234. The clock signal CLKOUT generated by clock distribution circuit 232 is transmitted to splitter 236 that, in turn, distributes the clock signal back to clock generation circuit 212 of leader radar device 210 and clock generation circuit 282 of follower radar device 260. Although follower radar device 260 includes similar clock generation circuitry, that circuit is disabled in the follower device 260.

Leader radar device 210 includes a data interface 236 enabling leader radar device 210 to communicate data with central processor 290 of radar system 200.

Follower radar device 260 may include the same functional components as leader radar device 210, however, during normal operations of radar system 200 some of those components may be disabled. For example, during normal operations, the clock distribution circuit 282 of the follower radar device 260 is disabled. However, in the event of failure in the clock distribution circuit 232 of leader radar device 210, the clock distribution circuit 282 of follower radar device 260 may be enabled to allow for normal operations of radar system 200.

Follower radar device 260 incorporates a radar transceiver formed by at least a frequency generation circuit, which in this example includes a reference or clock phase locked loop (PLL) 262 and a chirp PLL 264. In accordance with the present disclosure, chirp PLL 264 is configured to generate chirp signals having frequencies $f_{chirp}+(f_{BUMP\_OFFSET}/M)$, where M is a multiplier determined by a predetermined frequency plan and $f_{BUMP\_OFFSET}$ is equal to the frequency offset between the frequency of the transmitted radar signal and the frequency of the simultaneously-received signal that is the reflection from the vehicle bumper. As discussed above, the value of $F_{BUMP\_OFFSET}$ is a non-zero offset value due to the propagation delays of the received reflection signal. As described below, these offset chirp signals are used by both leader radar device 210 and follower radar device 260 when processing received radar signals.

An output signal from chirp PLL 264 is transmitted to LO interface 266. LO interface 266 includes a multiplier 268 configured to increase the frequency of the signal received from chirp PLL 264 by the multiple M to generate an LO signal having frequency ($f_{chirp}$*M)+$f_{BUMP\_OFFSET}$. That LO signal is output by LO interface 266 at terminal 270 as the signal $LO_{out\_follower}$. The LO signal is also transmitted internally to switch 272, which transmits the LO signal to receiver 278. Receiver 278 uses the received LO signal $LO_{out\_follower}$ to process received radar signals that are received by receiver 278 as reflections from target objects 202 and bumper 204.

The processed received signals are passed from receiver 278 through one or more programmable bandpass filter(s) and one or more gain amplifiers (not shown) to analog-to-digital converter 280 for processing to identify the relative range, velocity and direction or arrival of the various observed target objects 202.

Follower radar device 260 includes terminal 276 that is configured to receive an input LO signal (e.g., from terminal 220 of leader radar device 210) with a frequency equal to $f_{chirp}$*M. That signal is received by switch 272 of LO interface 266 and transmitted to transmitter 274. Transmitter 274 uses the received LO signal to generate radar signals that are transmitted by transmitter 274 towards target objects 202. Specifically, high-frequency output signals of the transmitter 274 are passed to power amplifiers (e.g., via a phase shifter circuit) (both not shown), where the signals are amplified within transmitter 274 and routed to transmitting antennae.

Follower radar device 260 includes a clock distribution circuit 282. Although disabled during normal operations, reference clock signals can be generated by clock distribution circuit 282 using an input from a crystal oscillator (not shown) and distributed to leader radar device 210 to enable synchronization in the event of a failure of clock generation circuit 212 or leader radar device 210 generally.

Follower radar device 260 includes a data interface 286 enabling follower radar device 260 to communicate data with central processor 290 of radar system 200.

In the radar system 200 configured as depicted in FIG. 2, the transmitter 224 of leader radar device 210 and the transmitter 274 of follower radar device 260 are both configured to transmit signals using an input LO signal having the default LO signal frequency (i.e., $f_{chirp}$*M). In a conventional radar system, the system's receivers would use the same LO signal to process received signals. In contrast to those conventional systems, however, in radar system 200, the receiver 228 of leader radar device 210 and receiver 278 of follower radar device 260 both use an input LO signal having a frequency of ($f_{chirp}$*M)+$f_{BUMP\_OFFSET}$ to process the received radar signals. By processing the received signals using an LO signal having a frequency that is offset from the frequency of the LO signal used to generate the radar system 200's transmitted signals, the present radar system 200 effectively shifts signals received from bumper reflections (i.e., having frequencies of ($f_{chirp}$*M)+$f_{BUMP\_OFFSET}$) to DC offsets when the received signals are processed in the frequency domain. The frequency shift results due to mixer down conversion using an LO signal having frequency ($f_{chirp}$*M)+$f_{BUMP\_OFFSET}$. The received signal (at RX in) is at frequency (fchirp*M)+$f_{BUMP\_OFFSET}$). After mixer down conversion using an LO signal having a frequency of (fchirp*M)+$f_{BUMP\_OFFSET}$, the processed signal has a baseband at frequency $f_{BUMP}$−$f_{BUMP\_OFFSET}$, resulting in the bumper reflections signals constituting a DC offset (or signal at 0 Hz) in the processed signal Those DC offsets can then be removed from the processed signals by applying a high pass filter to the processed signals. Because the high pass filter is only required to remove the low frequency DC offset values from the processed signals, the cut-off frequency may have a relatively low cut off frequency in the range of 100 Kilohertz (KHz) to 300 KHz although other high pass filters with different cutoff frequencies may be used. Consequently, as described in more detail below, radar system 200 can effectively remove effects of the bumper reflection signals when processing received radar signals using such a high-pass filter.

The present radar signal interference mitigation approach, therefore, may be implemented by a radar system including at least two radar devices in which a first radar device comprises a leader radar device configured to use its chirp generation circuitry to generate an LO signal having a frequency $f_{LO}$ and a follower radar device configured to use its chirp generation circuits to generate an LO signal having a frequency $f_{LO}$+$f_{BUMP\_OFFSET}$. Both radar devices use the LO signal having frequency $f_{LO}$ to transmit radar signals, and the LO signal having frequency $f_{Lo}$+$f_{BUMP\_OFFSET}$ to down convert and process the reflected radar signals that are received by each radar device. In this approach, the frequency spectrum being processed by each radar device is shifted from the transmitted signals to the received signals by a frequency of $f_{BUMP\_OFFSET}$. And, specifically, the based band of the received signal is effectively increased by the frequency $f_{BUMP\_OFFSET}$. Consequently, when the received signals are processed using the LO signal having frequency $f_{LO}$+$f_{BUMP\_OFFSET}$ the components of the received signal that result from bumper (or other vehicle structure) reflections is effectively shifted to become a DC component of the received signal. The bumper reflected signals are therefore effectively translated into to a DC component of the received signal, which can be filtered out via receiver high-pass filters in the receiver-based signal processing system, which, in turn, removes any interference generated by the bumper reflections from the received signal.

Figure 3:
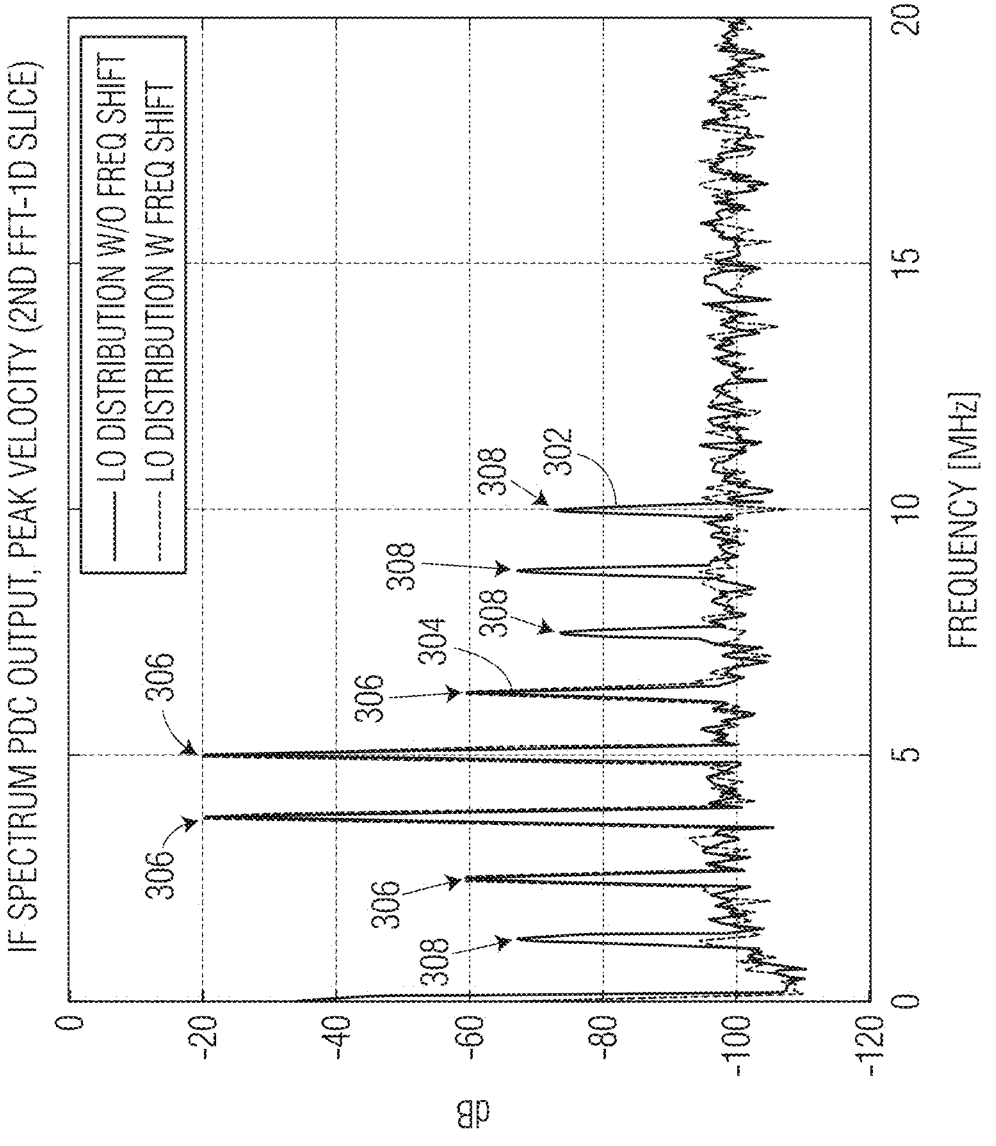
FIG. 3 is a chart depicting processed received radar signals for a conventional radar system and a radar system configured in accordance with the present disclosure.

To illustrate, FIG. 3 is a graph depicting processed received radar signals for a conventional radar system and a radar system configured in accordance with the present disclosure. In FIG. 3, the horizontal axis represents frequency (f), while the vertical axis represents the magnitude of the received signal in decibels (dB). Trace 302 represents the output of a conventional radar system based upon processing of a received radar signal that includes bumper (or other vehicle structure) reflection components and where the transmitted and received signals are each processed using an LO signal of same frequency $f_{LO}$. Conversely, trace 304 represents the output of the present radar system based upon processing of a received radar signal that includes bumper (or other vehicle structure) reflection components and where the transmitted signals are processed using an LO signal of frequency $f_{LO}$ and the received signals are processed using an LO signal of frequency $f_{LO}$+$f_{BUMP\_OFFSET}$.

The example processed signals in FIG. 3 are based on the same multi-target scenario in which two real-world targets are present and have reflected radar signals. The two targets generate their own reflection signals that correspond to the depicted signal peaks at the f2=3.75 MHz (for the first target) and f3=5 MHz (for the second target). The frequency of the signal contributed by the bumper reflections is equal to f1=32 kHz.

As depicted in FIG. 3, both processed signals represented by trace 302 and 304 include magnitude peaks 306 due to signals being reflected by potential targets (i.e., reflections from non-vehicle structures that represent real-world objects in proximity to the vehicle). In addition to those signal peaks 306, which provide useful information, trace 302 includes a number of false peaks 308 that represent false signals that are generated as a result of bumper reflection signal interference.

In the conventional radar system's output depicted by trace 302, the interference signals (i.e., IMD products) of the two targets at frequencies of f2 and f3 can be identified in the IF spectrum at frequencies 2*f3−f2 and 2*f2−f3. However, trace 302 also includes additional false peaks 308 due to IMD products caused by the true target signal interaction with the bump reflection signals. Those peaks are at many different frequencies f2+f3−f1, f2+f3+f1, f1−f2+f3, . . . , etc.).

In trace 304, which depicts the signal processed in accordance with the present disclosure, the full signal spectrum is shifted by the frequency of the bumper reflections (i.e., by −f1) and as such, the f1 frequency is converted into a DC offset that can be filtered to remove all IMD products due to the bumper reflection signals. This, in turn, can reduce the number of false targets in the receiver spectrum, which are equivalent to the false peaks 308 in trace 302.

Figure 4:
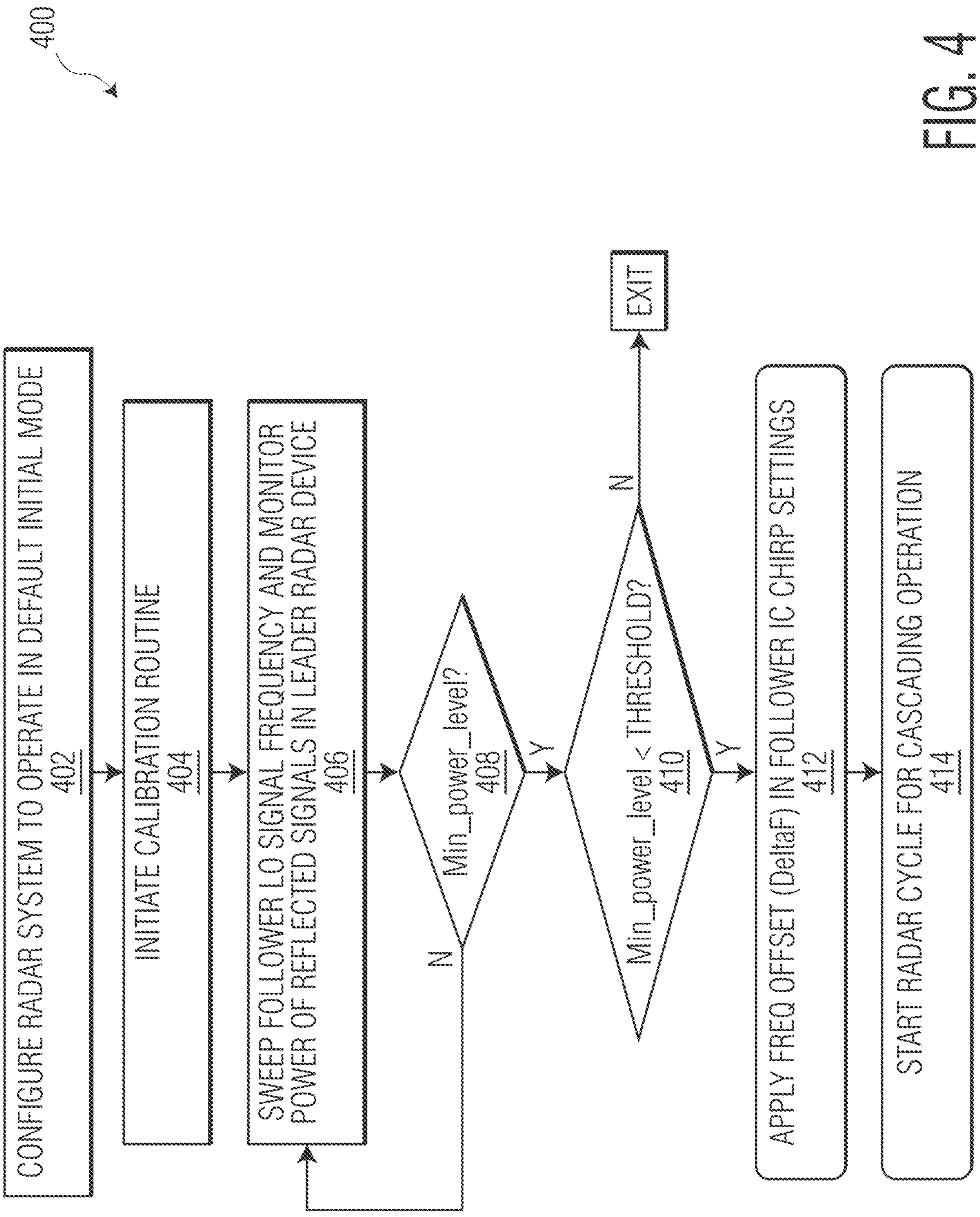
FIG. 4 depicts a method that may be implement by a radar system controller to determine a frequency of reflected radar signals emanating from a bumper or other structure of a vehicle.

When implementing the present method, it is necessary to determine the value of $f_{BUMP\_OFFSET}$ that provides the offset between the frequency of the LO signal used by radar system 100 to create and transmit radar signals and the frequency of the LO signal used by radar system 100 to processed received reflections. FIG. 4 depicts a method 400 that may be implemented by a controller (e.g., central processor 290 of radar system 200) or other computer controller or processing element implemented in conjunction with a radar system to determine the frequency of reflected radar signals emanating from a bumper or other structure of a vehicle. Method 400 may be implemented as a calibration routine that is executed each time the radar system is turned on. Alternatively, method 400 may be executed on a predetermined time schedule or may be triggered based upon other non-temporal event triggers.

In step 402, the radar system (e.g., radar system 200) is configured to operate in a default initial mode. This may involve configuring radar devices (e.g., leader radar device 210 and follower radar device 260) to operate in a conventional leader/follower configuration in which the LO signals being generated by chirp PLL 214 and chirp PLL 264 have the same default or initial frequency (i.e., the frequencies of $LO_{OUT\_F}$ and $LO_{OUT\_L}$ are equal to $f_{chirp}$*M) and the same LO signals are supplied to transmitter 224 and receiver 228 of leader radar device 210 and to transmitter 274 and receiver 278 of follower radar device 260. In this default initial mode, leader radar device 210 and follower radar device 260 are operating in a conventional leader/follower arrangement.

In step 404, the calibration routine is initialized. The calibration routine includes a control loop that iteratively executes steps 406 and 408 of method 400. Specifically, in step 406, the controller sweeps the frequency of the LO signal ($LO_{OUT\_F}$) used to process received radar signals and generated by the LO signal generator circuit (e.g., chirp PLL 264 and multiplier 268) of follower radar device 260. As illustrated in FIG. 2, that signal is supplied to terminal 226 of leader radar device 210 and is ultimately used by receiver 228 of leader radar device 210 to processed received radar signals, where those signals may include those that are reflected by a vehicle bumper or other structure nearby the radar system.

The frequency of $LO_{OUT\_F}$ may be swept through a continuous range of frequencies up to a predetermined maximum frequency. In other embodiments, sweeping the frequency of the $LO_{OUT\_F}$ signal may involve increasing the frequency through a number of distinct values by predetermined frequency increase steps or intervals (e.g., by increasing the frequency by 5 Hz at time, or by some other suitable discrete frequency step).

While the frequency of the $LO_{OUT\_F}$ signal generated by follower radar device 260 is swept, leader device 210 (or another controller connected to the radar system) is configured to continuously (i.e., at a predetermined measurement frequency) monitor the power level of radar signals being received by receiver 228 of leader radar device 210. If the measured power level of the received radar signals is at a minimum power level as determined in step 408, the frequency of the $LO_{OUT\_F}$ signal that results in the minimum measured power level is stored and represents the frequency $f_{BUMP}$. The frequency difference between that $LO_{OUT\_F}$ signal and the $LO_{OUT\_L}$ is equal to $f_{BUMP\_OFFSET}$—the frequency offset between the frequency of the transmitted radar signal and the frequency of the simultaneously-received signal that is reflected by the bumper (or another vehicle structure). This results because, during execution of the calibration routine, any radar signals received by receiver 228 of leader radar device 210 will be composed of radar signal reflections from the vehicle bumper (or other vehicle structures coupled to the vehicle radar system) as well as other signals. While sweeping the frequency of the signal $LO_{OUT\_F}$, the frequency of $LO_{OUT\_F}$ that results in the lowest power signal being received by leader radar device 210, therefore, most likely represents the frequency of those bumper reflection signals. By setting $LO_{OUT\_F}$ to that frequency, as discussed above, those reflection signals are removed from the processed, resulting the low magnitude detected signal at multiplier 218.

If, in step 408 it is determined that the measured power level is not a minimum value, the method returns to step 406 to continue adjusting the frequency of the $LO_{OUT\_F}$ signal to identify the frequency that results in the minimum power level.

The control loop of steps 406 and 408 may be implemented in any suitable manner configured to sweep a set of $LO_{OUT\_F}$ signal frequencies to identify the frequency that results in the minimum measured received radar signal power level. In some cases, this may involve sweeping all available frequencies of the $LO_{OUT\_F}$ signal and storing all measured power levels. The measured power levels can then be sorted to identify the minimum power level and the corresponding $LO_{OUT\_F}$ signal frequency.

In some cases, it may be possible to identify the minimum power level without sweeping all available $LO_{OUT\_F}$ signal frequencies. In many implementations, the reflection signals being generated by the bumper or other structure may have a maximum magnitude when the frequency of $LO_{OUT\_F}$ is equal to the frequency of the leader device (e.g., leader radar device 210) $LO_{OUT\_L}$ signal. However, as the frequency of $LO_{OUT\_F}$ is increased above that of $LO_{OUT\_L}$, the magnitude of the received radar signals will decrease consistently (e.g., monotonically) to a minimum value at a particular frequency of the $LO_{OUT\_F}$ signal. Then, as the frequency of the $LO_{OUT\_F}$ signal increases, the magnitude of the receive radar signal will begin increase. This behavior is illustrated in FIG. 5 that is chart 500 depicting the relationship of the receive radar signal power level to the frequency of the $LO_{OUT\_F}$ signal.

In chart 500, the vertical axis represents the magnitude of the power level of the received radar signal and the horizontal axis represents the relative frequency of the $LO_{OUT\_F}$ signal. At point 502, the frequency of $LO_{OUT\_F}$ is equal to $LO_{OUT\_L}$. In that condition, a magnitude of the received radar signal is at a maximum value. As the frequency of the $LO_{OUT\_F}$ signal is increased, however, the magnitude of the received radar signal decreases until a minimum value is reached at point 504. At that point, the frequency of the $LO_{OUT\_F}$ signal is equal to the frequency of the $LO_{OUT\_L}$ signal plus an offset of DeltaF, which is equal to the frequency $f_{BUMP}$.

Figure 5:
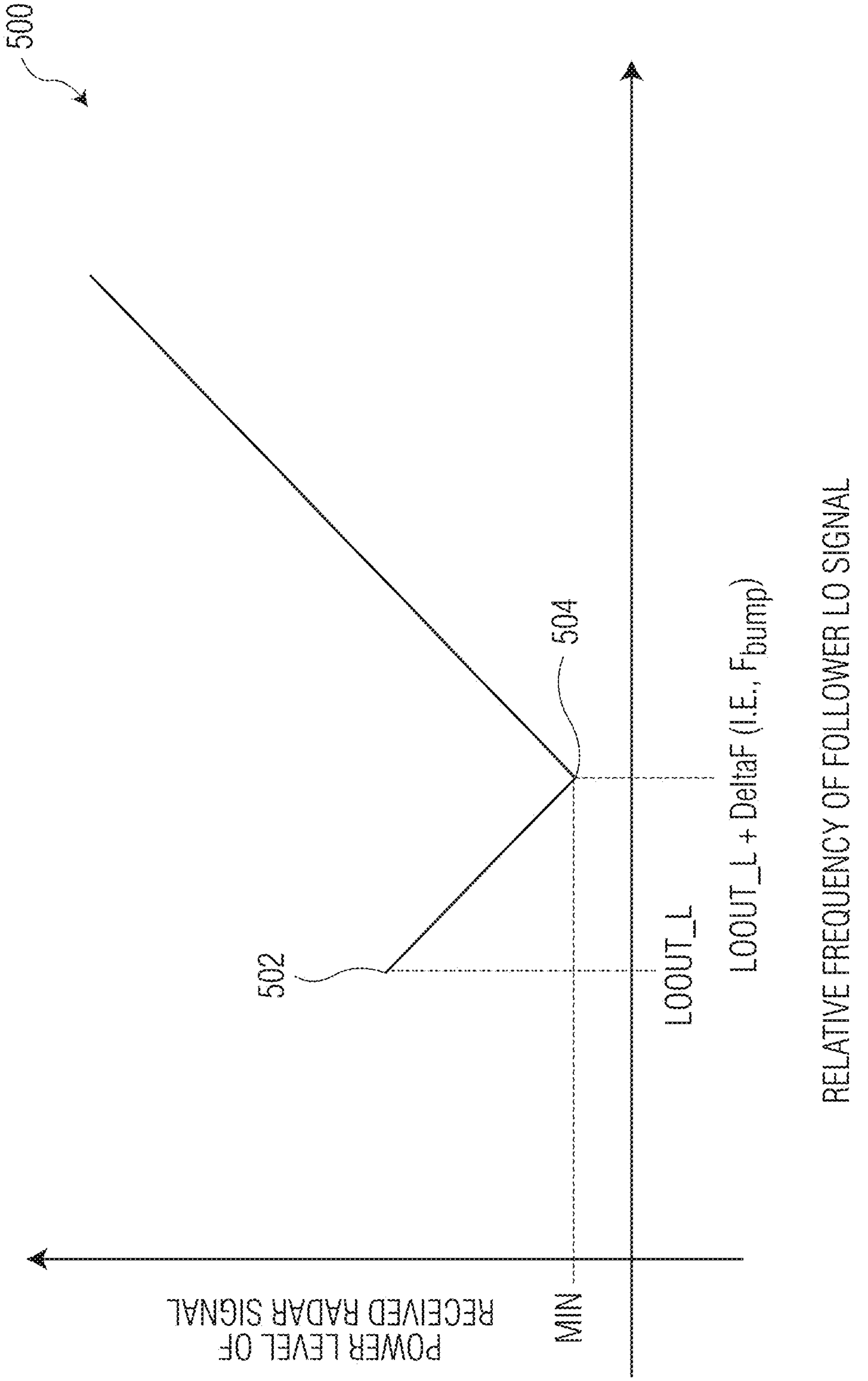
FIG. 5 is chart depicting the relationship of received radar signal power level to the frequency of the follower LO signal in the radar system of FIG. 2.

Given the relationship between the magnitude of the received radar signal to the frequency of the $LO_{OUT\_F}$ signal as depicted in FIG. 5, therefore, the frequency of the $LO_{OUT\_F}$ Signal may be swept through increasing values (e.g., in step 406). While the frequency is swept, step 408 may involve continuously measuring the power level of the received radar signal to detect the inflection point at point 504 of FIG. 5. This may involve determining the frequency of the $LO_{OUT\_F}$ signal at which the measured power level increased compared the immediately previously measured power level.

In some embodiments, the analysis performed in step 408 to determine the power level of the received radar signal may involve some preliminary processing of the received signals before the power level values are determined. Specifically, in some embodiments, the power levels of the received radar signals may be determined by performing a fast Fourier transform on the received signals to convert the received signals into the frequency domain. The power levels of the received signal may then be determined by analyzing the power levels of lower frequency bins (e.g., portions or bins of the signal have frequencies that range from about 0 KHz to about 50 KHZ) of the frequency domain signal.

With the frequency of the $LO_{OUT\_F}$ signal that corresponds to the minimum received power level (i.e., $f_{BUMP}$) determined, in step 410 an optional validity check may be performed to determine whether the power level associated with the frequency $f_{BUMP}$ is below some predetermined threshold value indicating that it is a valid value. If the minimum power level is too high, that may indicate that there were obstacles or other objects nearby the vehicle's bumper when the calibration routine was executed. Those objects would likely have generated their own radar reflections that would have increased the overall power of the received radar signal and indicate that the determined frequency $f_{BUMP}$ may not be accurate as it may be calibrated to the frequency of the signals reflected by those objects rather than the bumper itself. If, however, the minimum power level falls below that threshold value, that indicates that the reflected radar signals have primarily originated from the vehicle bumper itself (and not other nearby objects) and that the frequency $f_{BUMP}$ is likely a valid value. Accordingly, in step 410 if the measured minimum power level exceeds the minimum threshold, the method exits and generates a flag signal or fault signal indicating that the calibration routine has failed. If, however, the minimum power level falls below the threshold, $f_{BUMP}$ is determined to be a valid value and the method proceeds to step 412.

In typical embodiments, in which radar systems are configured to transmit radar signals in frequency ranges of 50 Gigahertz (GHz) to about 100 GHz, the frequency $f_{BUMP}$ is generally in the range of 1 KHz to 50 KHz greater than the frequency of the LO signal used by the radar system to generate and transmit radar signals. In a radar system configured in accordance with the present disclosure, the threshold minimum power level may be in the range of 1 dB and 6 dB, although other minimum power level threshold may be utilized depending upon the radar system implementation and operating conditions.

In step 412, the follower radar device 260 is configured to operate with an $LO_{OUT\_F}$ signal having a frequency equal to $f_{BUMP}$ and in step 414 the radar system resumes normal operation. As discussed above, by configuring the follower radar device 260 to operate with an $LO_{OUT\_F}$ signal having a frequency equal to $f_{BUMP}$, interference generated by radar signals being reflected by the vehicle bumper and other structures are minimized enabling the radar system to generate more accurate analysis of potential targets in the vicinity of the vehicle.

In some cases, when the LO signals used to transmit and received radar signals are different, the signal processing algorithms that are used to process the received radar signals to identify the range and relative velocity of nearby objects may result in a velocity offset being associated identified targets as determined by range Doppler processing those reflection signals. As such, after configuring the radar system for operations in which the $LO_{OUT\_F}$ signal has a frequency equal to $f_{BUMP}$, it may be necessary to apply a Doppler shift conversion to correct for those velocity offsets.

For example, if the frequency offset (i.e., the difference between the frequency of the $LO_{OUT\_L}$ signal and the frequency of the $LO_{OUT\_F}$ signal) is not equal to a multiple of the radar system's chirp signal duration ($T_{chirp}$), there may be a perceived Doppler shift from one range-Doppler frame to the next. This can be corrected by applying an opposing Doppler shift to each processed range-Doppler frame according to the follow expressions:

$$2.\{DeltaF.Tchirp\}.\text{Fdoppler\_max}/2 \text{ when } 0 < \{DeltaF.Tchirp\} <= 0.5 \quad (1)$$

$$-2.[1-\{DeltaF.Tchirp\}].\text{Fdoppler\_max}/2 \text{ when } 0.5 < \{DeltaF.Tchirp\} <= 1 \quad (2)$$

Figure 6A:
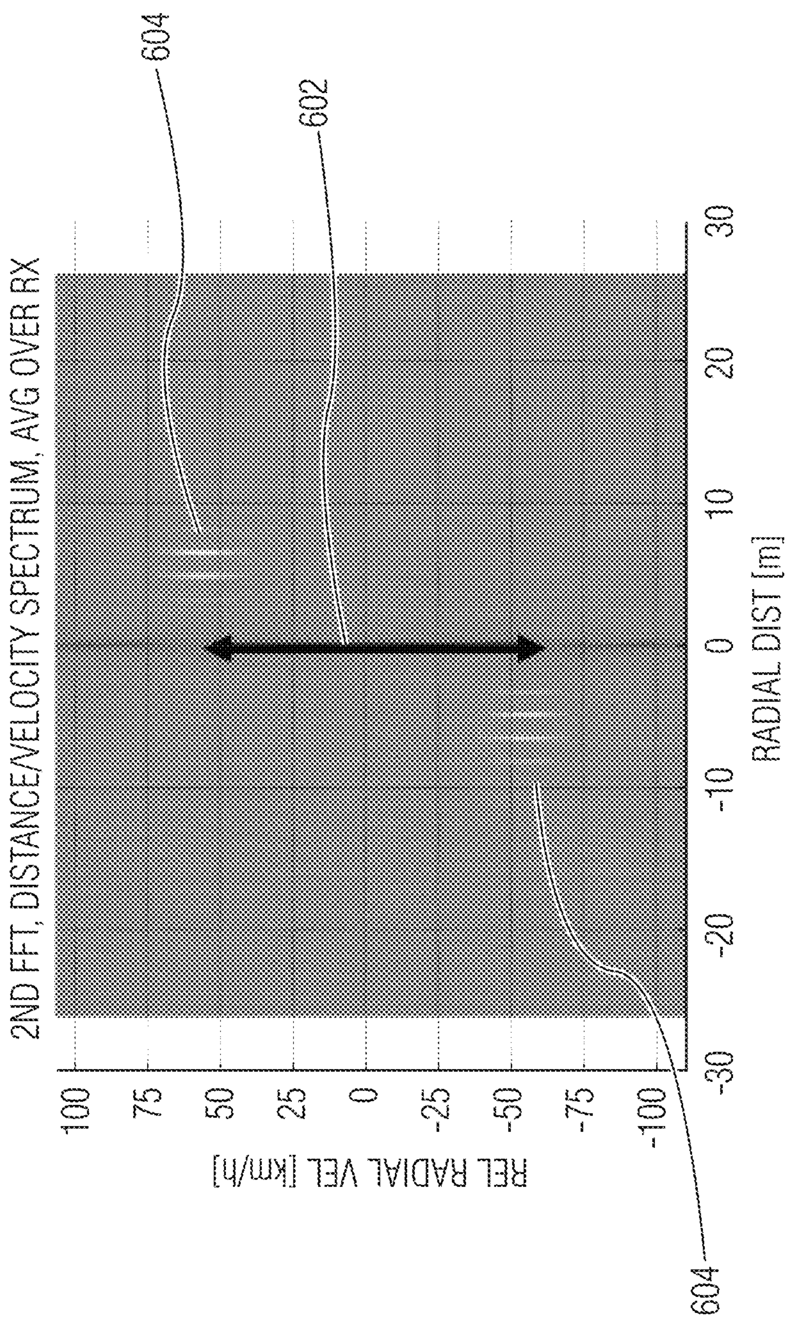
FIGS. 6A and 6B depict range Doppler data generated from received radar signals that include reflections emanating from a vehicle bumper.
Figure 6B:
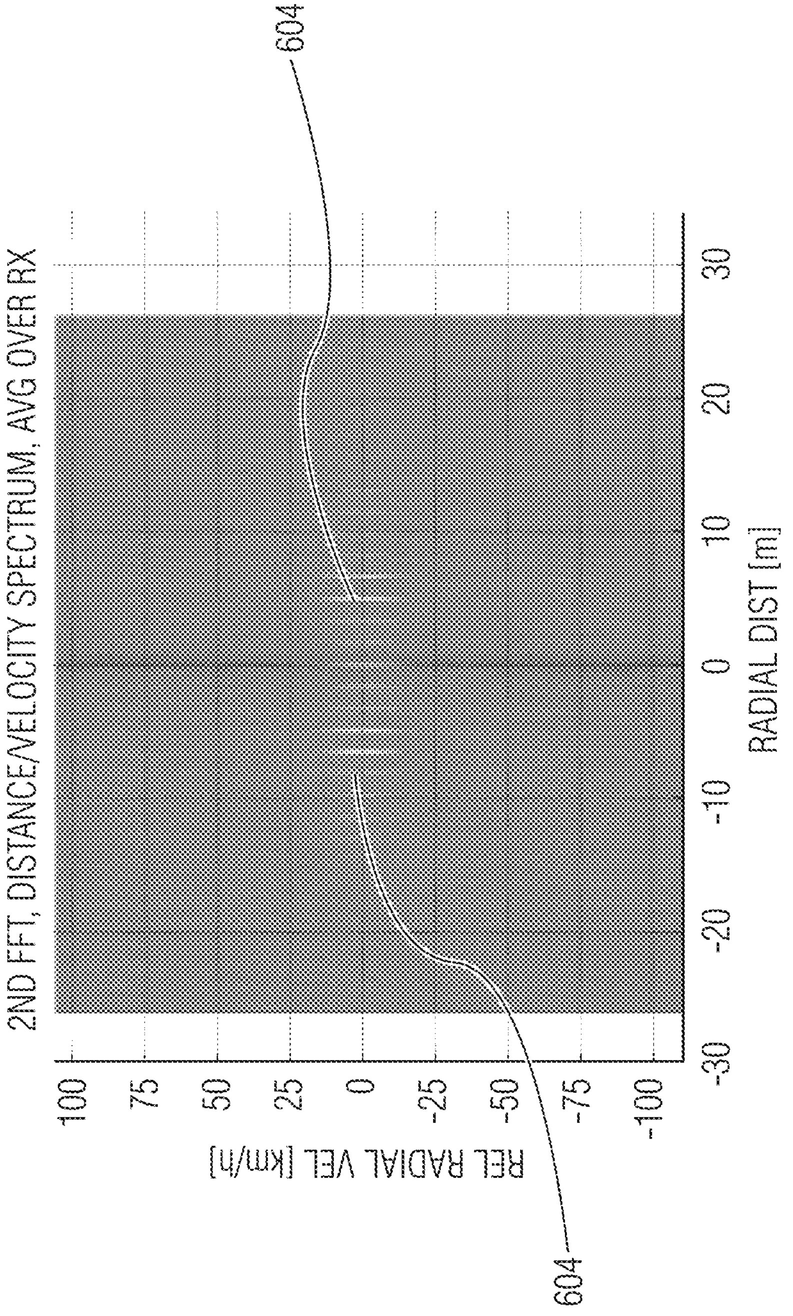

To illustrate, FIG. 6A depicts a range Doppler map generated by radar reflections emanating from a vehicle bumper in which the follower device LOOUT_F signal has a frequency equal to $f_{BUMP}$. As illustrated, there is an offset (see arrow 602) in the reflection signals (see elements 604) for the bumper that indicate the bumper has some non-zero relative velocity with respect to the vehicle radar system. By applying a corrective Doppler shift according to Equations (1) and (2), above, that relative velocity offset can be corrected, resulting the range Doppler map of FIG. 6B in which the relative velocity of the bumper, as indicted by the bumper reflection signals elements 604, is zero.

With that offset being applied to subset range Doppler frames generated by the vehicle radar system that Doppler offset can be corrected enabling the radar system to operate normally.

In some aspects, the techniques described herein relate to an automotive radar system, including: a first radar device coupled to a structure of a vehicle, the first radar device including: a first clock generation circuit configured to generate a first clock signal based upon a first input signal from a first crystal oscillator, a first local oscillator signal generator including a first phase locked loop circuit configured to generate a first local oscillator signal using the first clock signal, the first local oscillator signal having a first frequency, first transmitters configured to transmit first transmitted radar signals using the first local oscillator signal, wherein the first transmitted radar signals include radar chirp signals, a first terminal configured to receive a second local oscillator signal having a second frequency, wherein the second frequency is offset from the first frequency by a predetermined offset value, and first receivers configured to, while the first transmitters are transmitting the first transmitted radar signals, process first received radar signals using the second local oscillator signal to generate a first processed radar signal, wherein the first received radar signals include a reflected signal reflected by the structure of the vehicle; a second radar device coupled to the structure of the vehicle, the second radar device including: a second local oscillator signal generator including a second phase locked loop circuit configured to generate the second local oscillator signal using the first clock signal, a second terminal configured to receive the first local oscillator signal, second transmitters configured to transmit second transmitted radar signals using the first local oscillator signal, and second receivers configured to process second received radar signals using the second local oscillator signal to generate a second processed radar signal, wherein the second received radar signals include the reflected signal; and a controller configured to generate an output signal by: executing a fast Fourier transform on at least one of the first processed radar signal and the second processed radar signal to generate a frequency-domain output signal, and executing a high-pass filter on the frequency-domain output signal to generate the output signal.

In one or more embodiments, the predetermined offset value is at least partially determined by a distance of the structure of the vehicle from the automotive radar system.

In one or more embodiments, wherein the controller is configured to execute a calibration routine to determine the predetermined offset value by: causing the first radar device and the second radar device to set a frequency of the first local oscillator signal equal to an initial frequency and a frequency of the second local oscillator signal equal to the initial frequency, while increasing the frequency of the second local oscillator signal, measuring a plurality of power levels of the reflected signal at different frequencies, determining the frequency of the second local oscillator signal that corresponds to a minimum power level of the plurality of power levels, and setting the second frequency equal to the frequency of the second local oscillator signal that corresponds to the minimum power level of the plurality of power levels.

In one or more embodiments, the controller is configured to: determine that the minimum power level of the plurality of power levels exceeds a predetermined threshold; and generate a flag signal indicating that the calibration routine has failed.

In one or more embodiments, a difference between the first frequency of the first local oscillator signal and the second frequency of the second local oscillator signal is between 100 Kilohertz and 300 Kilohertz.

In one or more embodiments, the automotive radar system is configured in a cascade configuration in which the first radar device is a leader device and the second radar device is one of a plurality of follower devices.

In one or more embodiments, the structure of the vehicle includes a bumper of the vehicle.

In some aspects, the techniques described herein relate to a radar system, including: a first radar device coupled to a structure of a vehicle, including: a transmitter configured to transmit a first transmitted radar signal at a first time using a first local oscillator signal having a first frequency, wherein the first transmitted radar signal is a radar chirp signal, and a receiver configured to process a first received radar signal received at the first time using a second local oscillator signal having a second frequency to generate a processed radar signal, wherein the second frequency is offset from the first frequency by a predetermined offset amount; and a controller configured to generate an output signal by: executing a fast Fourier transform on the processed radar signal to generate a frequency-domain output signal, wherein the second frequency is a direct-current offset of the frequency-domain output signal.

In one or more embodiments, the first radar device includes: a first clock generation circuit configured to generate a first clock signal based upon a first input signal from a first crystal oscillator; and a first local oscillator signal generator including a first phase locked loop circuit configured to generate a first local oscillator signal.

In one or more embodiments, the first radar device includes a terminal configured to receive the second local oscillator signal from a second radar device.

In one or more embodiments, the radar system is configured in a cascade configuration in which the first radar device is a leader device and the second radar device is one of a plurality of follower devices.

In one or more embodiments, the predetermined offset amount is at least partially determined by a frequency offset between the first transmitted radar signal at the first time and the first received radar signal at the first time.

In one or more embodiments, the controller is configured to execute a calibration routine to determine the predetermined offset amount by: measuring a plurality of power levels of the first received radar signal at different frequencies of the second local oscillator signal; and determining the frequency of the second local oscillator signal that corresponds to a minimum power level of the plurality of power levels.

In one or more embodiments, the controller is configured to: determine that the minimum power level of the plurality of power levels exceeds a predetermined threshold, and generate a flag signal indicating that the calibration routine has failed.

In one or more embodiments, a difference between the first frequency of the first local oscillator signal and the second frequency of the second local oscillator signal is between 100 Kilohertz and 300 Kilohertz.

In one or more embodiments, the structure of the vehicle includes a bumper of the vehicle.

In some aspects, the techniques described herein relate to a method, including: transmitting a first transmitted radar signal by a first transmitter using a first local oscillator signal having a first frequency, wherein the first transmitter is coupled to a structure of a vehicle; receiving a first received radar signal using a first receiver; processing the first received radar signal using a second local oscillator signal having a second frequency to generate a processed radar signal, wherein the second frequency is offset from the first frequency by a predetermined offset value; and generating an output signal by executing a fast Fourier transform on the processed radar signal to generate a frequency-domain output signal.

In one or more embodiments, the method further comprising executing a calibration routine to determine the second frequency.

In one or more embodiments, wherein the calibration routine includes: measuring a plurality of power levels of reflected signals at different frequencies of the second local oscillator signal; and determining the frequency of the second local oscillator signal that corresponds to a minimum power level of the plurality of power levels.

In one or more embodiments, the method further comprising: determining that the minimum power level of the plurality of power levels exceeds a predetermined threshold, and generating a flag signal indicating that the calibration routine has failed.

Although the examples have been described with reference to automotive radar systems, the systems and methods described herein may be implemented in conjunction with other types of radar systems.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. An automotive radar system, comprising:

a first radar device coupled to a structure of a vehicle, the first radar device including:

a first clock generation circuit configured to generate a first clock signal based upon a first input signal from a first crystal oscillator, a first local oscillator signal generator including a first phase locked loop circuit configured to generate a first local oscillator signal using the first clock signal, the first local oscillator signal having a first frequency, first transmitters configured to transmit first transmitted radar signals using the first local oscillator signal, wherein the first transmitted radar signals include radar chirp signals, a first terminal configured to receive a second local oscillator signal having a second frequency, wherein the second frequency is offset from the first frequency by a predetermined offset value, and wherein the predetermined offset value is at least partially determined by a distance of the structure of the vehicle from the automotive radar system, and first receivers configured to, while the first transmitters are transmitting the first transmitted radar signals, process first received radar signals using the second local oscillator signal to generate a first processed radar signal, wherein the first received radar signals include a reflected signal reflected by the structure of the vehicle;

a second radar device coupled to the structure of the vehicle, the second radar device including:

a second local oscillator signal generator including a second phase locked loop circuit configured to generate the second local oscillator signal using the first clock signal, a second terminal configured to receive the first local oscillator signal, second transmitters configured to transmit second transmitted radar signals using the first local oscillator signal, and second receivers configured to process second received radar signals using the second local oscillator signal to generate a second processed radar signal, wherein the second received radar signals include the reflected signal; and a controller configured to:

generate an output signal by:

executing a fast Fourier transform on at least one of the first processed radar signal and the second processed radar signal to generate a frequency-domain output signal, and executing a high-pass filter on the frequency-domain output signal to generate the output signal; and execute a calibration routine to determine the predetermined offset value by:

causing the first radar device and the second radar device to set a frequency of the first local oscillator signal equal to an initial frequency and a frequency of the second local oscillator signal equal to the initial frequency, while increasing the frequency of the second local oscillator signal, measuring a plurality of power levels of the reflected signal at different frequencies, determining the frequency of the second local oscillator signal that corresponds to a minimum power level of the plurality of power levels, and setting the second frequency equal to the frequency of the second local oscillator signal that corresponds to the minimum power level of the plurality of power levels.

2. The automotive radar system of claim 1, wherein the controller is configured to:

determine that the minimum power level of the plurality of power levels exceeds a predetermined threshold; and generate a flag signal indicating that the calibration routine has failed.

3. The automotive radar system of claim 1, wherein a difference between the first frequency of the first local oscillator signal and the second frequency of the second local oscillator signal is between 100 Kilohertz and 300 Kilohertz.

4. The automotive radar system of claim 1, wherein the automotive radar system is configured in a cascade configuration in which the first radar device is a leader device and the second radar device is one of a plurality of follower devices.

5. The automotive radar system of claim 1, wherein the structure of the vehicle includes a bumper of the vehicle.

6. A radar system, comprising:

a first radar device coupled to a structure of a vehicle, including:

a transmitter configured to transmit a first transmitted radar signal at a first time using a first local oscillator signal having a first frequency, wherein the first transmitted radar signal is a radar chirp signal, and a receiver configured to process a first received radar signal received at the first time using a second local oscillator signal having a second frequency to generate a processed radar signal, wherein the second frequency is offset from the first frequency by a predetermined offset amount, wherein the predetermined offset amount is at least partially determined by a frequency offset between the first transmitted radar signal at the first time and the first received radar signal at the first time; and a controller configured to:

generate an output signal by:

executing a fast Fourier transform on the processed radar signal to generate a frequency-domain output signal, wherein the second frequency is a direct-current offset of the frequency-domain output signal; and execute a calibration routine to determine the predetermined offset amount by:

measuring a plurality of power levels of the first received radar signal at different frequencies of the second local oscillator signal; and determining the frequency of the second local oscillator signal that corresponds to a minimum power level of the plurality of power levels.

7. The radar system of claim 6, wherein the first radar device includes:

a first clock generation circuit configured to generate a first clock signal based upon a first input signal from a first crystal oscillator; and a first local oscillator signal generator including a first phase locked loop circuit configured to generate a first local oscillator signal.

8. The radar system of claim 6, wherein the first radar device includes a terminal configured to receive the second local oscillator signal from a second radar device.

9. The radar system of claim 8, wherein the radar system is configured in a cascade configuration in which the first radar device is a leader device and the second radar device is one of a plurality of follower devices.

10. The radar system of claim 6, wherein the controller is configured to:

determine that the minimum power level of the plurality of power levels exceeds a predetermined threshold, and generate a flag signal indicating that the calibration routine has failed.

11. The radar system of claim 6, wherein a difference between the first frequency of the first local oscillator signal and the second frequency of the second local oscillator signal is between 100 Kilohertz and 300 Kilohertz.

12. The radar system of claim 6, wherein the structure of the vehicle includes a bumper of the vehicle.

13. A method, comprising:

transmitting a first transmitted radar signal by a first transmitter using a first local oscillator signal having a first frequency, wherein the first transmitter is coupled to a structure of a vehicle;

receiving a first received radar signal using a first receiver;

processing the first received radar signal using a second local oscillator signal having a second frequency to generate a processed radar signal, wherein the second frequency is offset from the first frequency by a predetermined offset value;

generating an output signal by executing a fast Fourier transform on the processed radar signal to generate a frequency-domain output signal; and executing a calibration routine to determine the second frequency, wherein the calibration routine includes:

measuring a plurality of power levels of reflected signals at different frequencies of the second local oscillator signal; and determining the frequency of the second local oscillator signal that corresponds to a minimum power level of the plurality of power levels.

14. The method of claim 13, further comprising:

determining that the minimum power level of the plurality of power levels exceeds a predetermined threshold, and generating a flag signal indicating that the calibration routine has failed.

* * * * *